United States Patent
Laurent

[11] 4,174,153
[45] Nov. 13, 1979

[54] VARIFOCAL OBJECTIVE WITH FOCAL LENGTH ADJUSTMENT

[75] Inventor: François Laurent, Yverdon, Switzerland

[73] Assignee: Bolex International SA, Ste-Croix, Switzerland

[21] Appl. No.: 851,352

[22] Filed: Nov. 14, 1977

[30] Foreign Application Priority Data

Nov. 15, 1976 [AT] Austria .................................. 8501/76

[51] Int. Cl.² ........................ G02B 15/10; G02B 15/16
[52] U.S. Cl. .................................... 350/184; 350/176; 350/183; 350/191; 350/192; 354/295
[58] Field of Search ............... 350/184, 186, 176, 191, 350/192, 183

[56] References Cited

U.S. PATENT DOCUMENTS 4,110,005   8/1978   Böhm et al. .......................... 350/184

FOREIGN PATENT DOCUMENTS 2634941   2/1977   Fed. Rep. of Germany ........... 350/184
748910   5/1956   United Kingdom ..................... 350/184

Primary Examiner—Paul A. Sacher
Attorney, Agent, or Firm—Montague & Ross

[57] ABSTRACT

A varifocal camera objective is adjusted in its telephoto position, by an axial shift of one of its movable components or by the insertion of a negative lens member, to extend its overall focal length with consequent increase in its back-focal length, that increase being compensated by the emplacement of a supplemental positive lens member in first or second position. If the movement of the shiftable component is controlled by a cam track, the axial displacement thereof beyond the varifocal range may be normally blocked and may be unblocked only when a feeler detects the presence of the supplemental positive lens member. A similar feeler mechanism may be used to prevent the emplacement of an attachment bearing such a supplemental lens member unless the shiftable component is enabled to move into its off-normal position. A focal-length-increasing negative lens member may be carried on an eccentric disk for selective interposition into the path of incident light rays just ahead of a reflex prism. The supplemental positive lens member may have an aspherical surface approximating a paraboloid of revolution.

28 Claims, 18 Drawing Figures

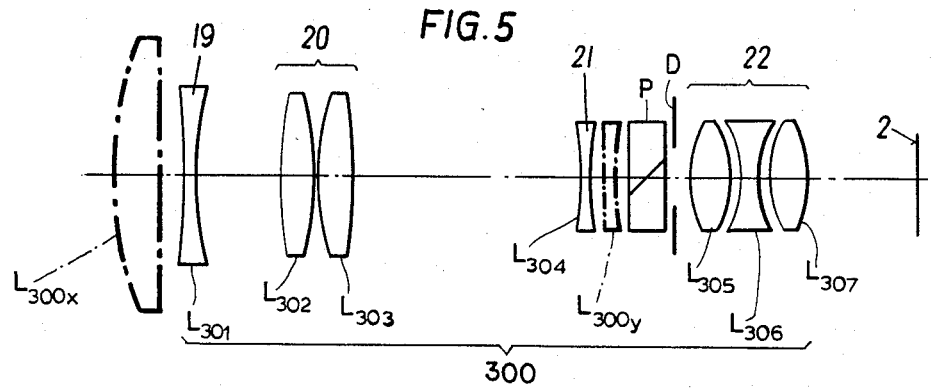
FIG. 5
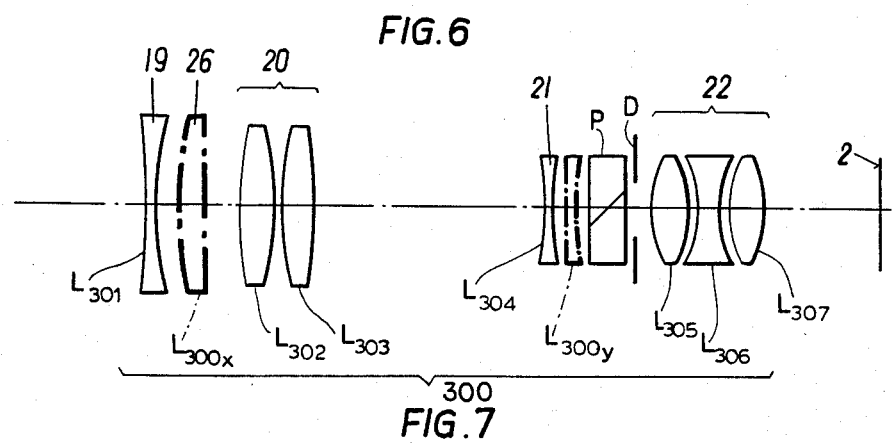
FIG. 6
FIG. 7

VARIFOCAL OBJECTIVE WITH FOCAL LENGTH ADJUSTMENT

FIELD OF THE INVENTION

My present invention relates to an optical objective including a positively refracting lens assembly, as used in photographic and cinematographic cameras, which is adapted to focus incident rays from remote objects upon a receiving surface (e.g. a sensitive film) in line with an image plane located rearwardly of that lens assembly.

BACKGROUND OF THE INVENTION

The usual photographic and cinematographic objective can be sharply focused upon objects in a normal range between infinity and a so-called macro range, the latter being generally defined as lying between the image-ratio limits of 1:10 and 1:1. In the case of varifocal or pancratic objectives, in which the image plane does not shift between a telephoto position and a wide-angle position brought about by the concurrent axial displacement of two movable components, focusing within the macro range can be achieved by axially shifting one of these movable components beyond the position occupied by it at the wide-angle end of the varifocal range; see, for example, U.S. Pat. No. 3,891,304. Moreover, as proposed in commonly owned application Ser. No. 711,835 filed by me jointly with two others on Aug. 5, 1976, now U.S. Pat. No. 4,110,005 the angle of view can be further increased with the aid of a front attachment to be emplaced on the optical axis, such an attachment being of compact design so that its presence does not significantly extend the overall physical length of the objective.

At the opposite or telephoto end of the varifocal range, however, no such simple attachments have heretofore been available for the purpose of further extending the overall focal length of the system to increase its image scale. In order to operate in such an extended telephoto range, telescope-type front attachments of considerable axial length had to be used. The presence of such a device not only complicates handling of the camera but also tends to destabilize same, thereby aggravating the risk of blurring which commonly exists to a greater or lesser extent in any objective of large focal length.

OBJECTS OF THE INVENTION

The general object of my present invention, accordingly, is to provide simple means for modifying an objective of standard optical quality to facilitate the taking of telephoto pictures with an image scale greater than that normally obtainable.

A more particular object is to provide means for adapting a convex varifocal or pancratic objective to the taking of such telephoto pictures.

SUMMARY OF THE INVENTION

In accordance with my present invention, a multilens optical objective is provided with focal-length-increasing means effective to enlarge the image scale thereof, with consequent rearward displacement of the image plane from its normal position in line with a receiving surface, and a positively refracting supplemental lens member which is emplaceable on the optical axis in line with the lens assembly of the objective for restoring the image plane to its normal position by shortening the back-focal length of the system.

There are two basic ways of increasing the focal length of such an objective, namely by the shifting of one of its lens members or by the interposition of a negatively refracting ancillary lens member in its ray path. With a pancratic objective including a varifocal lens group, either of these measures is preferably carried out in the telephoto position. Thus, by holding one of the shiftable components stationary and further displacing the other shiftable component, I can achieve the desired increase in overall focal length together with an unwanted increase in back-focal length which is to be compensated with the aid of the supplemental lens member of positive refractivity. Alternatively, however, the negatively refracting ancillary lens member may be introduced between certain elements of the lens assembly, preferably on the image side of both shiftable components, without further axial displacement.

In optical systems used with xerographic copying machines, in which an object plane and an image plane are separated by a fixed distance, it has already been proposed to change the image scale or magnification ratio by axially shifting a main lens group and selectively interposing a supplemental lens in the light path thereof; see, for example, U.S. Pat. No. 3,600,066. In the normal position of the main lens group, without any supplemental lens, that system has a magnification ratio of 1:1. In order to reduce this ratio, the main group is shifted with insertion of a supplemental lens whereby the overall focal length of the system is decreased. In contradistinction thereto, my present invention seeks to increase rather than to reduce the overall focal length of an objective.

According to a more particular feature of my invention, the supplemental lens member is to be emplaced either at the very front of the lens assembly or in second position, i.e. just behind a front component which may constitute one of the axially shiftable members of a varifocal lens group. In some instances, it will be desirable to provide this supplemental lens member with an aspherical surface for better correction of aberrations due to the shifting of another component beyond the telephoto position or the insertion of an ancillary negative lens member. Such an aspherical surface may approximate a paraboloid of rotation, as more fully described hereinafter; under less exacting conditions, however, that surface may conform to the paraboloid itself or even to its osculating sphere.

Since correct focusing in the extended telephoto range requires both the enlargement of the overall focal length and the emplacement of the supplemental positive lens member, means may be provided for preventing the inadvertent omission of one of these steps by the user which could result in the spoiling of a picture or even of an entire film. For this purpose, the mechanism designed to shift one of the movable components of the varifocal lens group beyond the telephoto position may be blocked in the absence of a front attachment carrying the supplemental lens member; alternatively, the emplacement of such a front attachment may be prevented unless the shiftable component is enabled to move into its off-normal position.

If the focal-length-increasing means includes a mechanism for interposing a negatively refracting lens member as described above, that mechanism advantageously comprises a disk-shaped lens carrier rotatable about an axis parallel to that of the objective and provided with a plurality of peripherally spaced cutouts, one of these cutouts containing the ancillary lens member. A similar arrangement may be used for the selective emplacement of the positively refracting supplemental lens member, especially when that member is to be inserted in some intermediate position.

BRIEF DESCRIPTION OF THE DRAWING

The above and other features of my invention will now be described in detail with reference to the accompanying drawing in which:

FIG. 2 shows a camera objective embodying the principles described with reference to FIGS. 1A–1C;

FIG. 5 shows another camera objective according to my invention, operable according to the principles of either FIGS. 1A–1C or FIGS. 2A–2C;

FIG. 6 shows a camera objective similar to that of FIG. 5, representing a modification;

FIG. 7 shows a cam member adapted to be used with the system of FIG. 3;

SPECIFIC DESCRIPTION

Figure 1A:
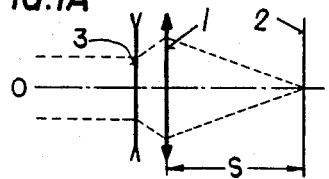
FIGS. 1A, 1B and 1C diagrammatically illustrate one of the aspects of my present invention, involving the axial shifting of a lens member for focal-length-increasing purposes.

FIG. 1A diagrammatically illustrates a multilens objective, represented in simplified fashion by a positive lens 1 and a negative lens 3, focused on infinity. The incident parallel light rays converge on an image plane 2 which in a camera would lie at the sensitized surface of a film or plate. The optical axis has been indicated at 0.

Figure 1B:
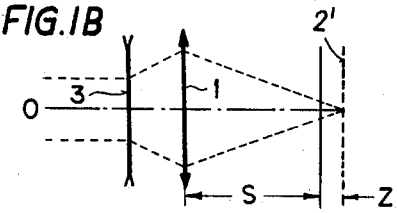

In FIG. 1B the negative lens 3 has been shown axially shifted to the left, i.e. toward the object side of the system. This shift causes an increase in the overall focal length of the objective and, with it, of its back-focal length s defined as the distance between its last lens vortex—that of member 1—and its image plane. The latter, therefore, has shifted to the right by a distance z to a position 2'.

Figure 1C:
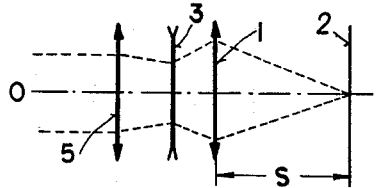
Figure 2C:
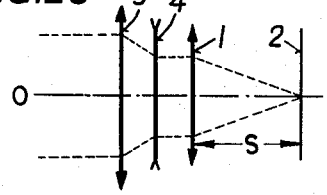

A supplemental positive lens 5 has been positioned in FIG. 1C forwardly of the lens assembly 1,3. The presence of lens 5 shortens the back-focal length s by the amount z, thus restoring the image plane to the position 2 of FIG. 1A, without reducing the overall focal length to its original value.

Although the shiftable member 3 of FIGS. 1A–1C is shown as a negatively refracting lens, there are also multilens systems—such as the one of FIG. 5 described hereinafter—in which a similar focal-length-increasing effect can be achieved by the leftward displacement of a positive lens member or component.

Figure 2A:
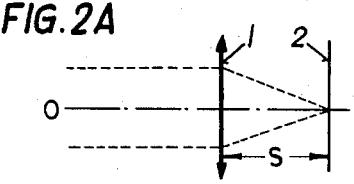
FIGS. 2A, 2B and 2C illustrate, in a similar diagrammatic way, another aspect of my invention involving the interposition of an ancillary lens member for the same purpose.
Figure 2B:
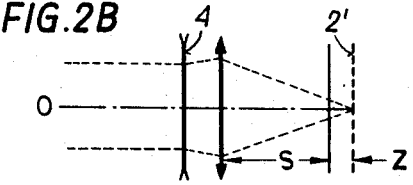

In FIG. 2A I have shown a similar multilens objective here represented simply by a single positive lens 1 again having an image plane 2. The addition of an ancillary lens 4, of negative refractivity, shifts that image plane to a more distant position 2', FIG. 2B, as the back-focal length s of the system increases to s+z along with its overall focal length. Here, too, the emplacement of a supplemental positive lens 5 in front of the basic objective 1 restores the image plane to its normal position 2 while preserving an increased overall focal length.

Figure 3:
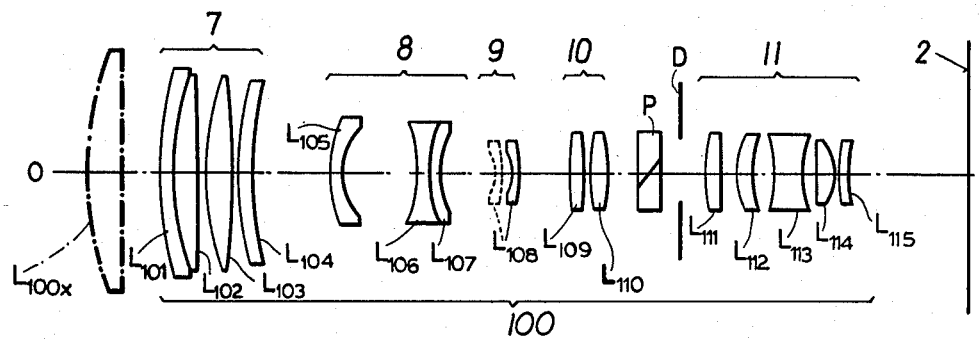

FIG. 3 depicts a complete camera objective according to my invention including a basic objective 100 and a supplemental, positive lens $L_{100x}$ selectively emplaceable in front thereof. Objective 100 consists of a varifocal front group with components 7, 8, 9, 10 and a fixed-focus rear group 11. Front component 7, which is positively refracting and stationary except for focusing purposes, consists of three air-spaced positive lens members, namely a doublet $L_{101}$, $L_{102}$ and two singlets $L_{103}$, $L_{104}$. The second, negatively refracting component is axially shiftable and consists of a negative singlet $L_{105}$ air-spaced from a biconcave doublet $L_{106}$, $L_{107}$. The third, also axially shiftable component 9 consists of a single negative lens $L_{108}$ here illustrated in two alternative positions, the one shown in dotted lines representing the conventional telephoto position while the other one (solid lines) indicates the extra shift given to this member for extending the telephoto range with simultaneously use of supplemental lens $L_{100x}$. Component 10, fixed and positively refracting, consists of two air-spaced biconvex lenses $L_{109}$, $L_{110}$. There follows an air space, occupied by a reflex prism P and a diaphragm D, separating the varifocal group 7–10 from the fixed-focus group 11; the latter consists of five air-spaced singlets, namely two positive lenses $L_{111}$, $L_{112}$, a negative lens $L_{113}$ and two further positive lens $L_{114}$, $L_{115}$.

In Table A, below, I have given representative numerical values in linear units (e.g. millimeters) for the radii r of the lenses shown in FIG. 3 as well as their thicknesses and separations d, together with their refractive indices $n_d$ and Abbé numbers $\nu_d$. In the wide-angle position, the system has a minimum focal length $f_{min}=7$; its maximum focal length in the telephoto position, without lens $L_{100x}$ and with lens $L_{108}$ in its dotted-line position, is $f_{max}=56$. With lens $L_{108}$ shifted to its full-line position and lens $L_{100x}$ in place, that focal length changes to $f_{ext}=80$. The image plane 2 retains its position in all instances, with a back-focal length $s=13.546$. In this and the following tables, items pertaining to the extended telephoto position according to my invention have been placed in parentheses.

TABLE A

| | r | d | | $n_d$ | $v_d$ |
|---|---|---|---|---|---|
| | (+740.000) | | | | |
| ($L_{100x}$) | | (3.000) | | (1.517) | (64.17) |
| | (∞) | | | | |
| | | (1.000) | air space | | |
| | +180.615 | | | | |
| $L_{101}$ | | 2.400 | | 1.805 | 25.43 |
| | +48.094 | | | | |
| $L_{102}$ | | 5.650 | | 1.607 | 59.46 |
| | +242.533 | | | | |
| | | 0.100 | air space | | |
| | +55.800 | | | | |
| $L_{103}$ | | 5.900 | | 1.620 | 60.33 |
| | −1034.500 | | | | |
| | | 0.100 | air space | | |
| | +39.960 | | | | |
| $L_{104}$ | | 3.900 | | 1.744 | 44.77 |
| | +81.340 | | | | |
| | | $f_{min}$ 1.160 | variable | | |
| | | $f_{max}$ 27.801 | air | | |
| | | $(f_{ext}$ 27.801) | space | | |
| | +126.360 | | | | |
| $L_{105}$ | | 1.200 | | 1.691 | 54.71 |
| | +13.872 | | | | |
| | | 5.150 | air space | | |
| | −33.159 | | | | |
| $L_{106}$ | | 1.000 | | 1.620 | 60.33 |
| | +18.364 | | | | |
| $L_{107}$ | | 3.100 | | 1.805 | 25.43 |
| | +84.000 | | | | |
| | | $f_{min}$ 23.915 | variable | | |
| | | $f_{max}$ 2.959 | air | | |
| | | $(f_{ext}$ 8.044) | space | | |
| | −15.981 | | | | |
| $L_{108}$ | | 1.000 | | 1.744 | 44.77 |
| | −59.820 | | | | |
| | | $f_{min}$ 12.503 | variable | | |
| | | $f_{max}$ 6.818 | air | | |
| | | $(f_{ext}$ 1.733) | space | | |
| | +108.104 | | | | |
| $L_{109}$ | | 3.383 | | 1.620 | 60.33 |
| | −45.822 | | | | |
| | | 0.123 | | | |
| | +74.746 | | | | |
| $L_{110}$ | | 2.706 | | 1.620 | 60.33 |
| | −113.160 | | | | |
| | | 1.230 | | | |
| | ∞ | | | | |
| P | | 6.150 | | 1.517 | 64.17 |
| | ∞ | | | | |
| D | — | 1.845 | diaphragm | | |
| | | 2.214 | space | | |
| | +36.455 | | | | |
| $L_{111}$ | | 3.505 | | 1.620 | 60.33 |
| | −116.115 | | | | |
| | | 0.123 | air space | | |
| | +19.468 | | | | |
| $L_{112}$ | | 3.506 | | 1.620 | 60.33 |
| | +42.280 | | | | |
| | | 4.920 | air space | | |
| | −20.498 | | | | |
| $L_{113}$ | | 2.645 | | 1.847 | 23.83 |
| | +20.498 | | | | |
| | | 3.998 | air space | | |
| | +1124.045 | | | | |
| $L_{114}$ | | 4.059 | | 1.713 | 53.83 |
| | −15.055 | | | | |
| | | 0.123 | air space | | |
| | +18.079 | | | | |
| $L_{115}$ | | 2.768 | | 1.620 | 60.33 |
| | +69.946 | | | | |

It will be noted that the air space between lenses $L_{110}$ and $L_{111}$, accommodating the prism P and the diaphragm D, equals 11.439 units.

It may be mentioned that the emplacement of lens $L_{100x}$ accompanied by an axial shift of lens $L_{108}$ is also possible with the first variable air space (between lenses $L_{104}$ and $L_{105}$) smaller than in the telephoto position, though the increase in overall focal length will then not be as great.

Figure 4:
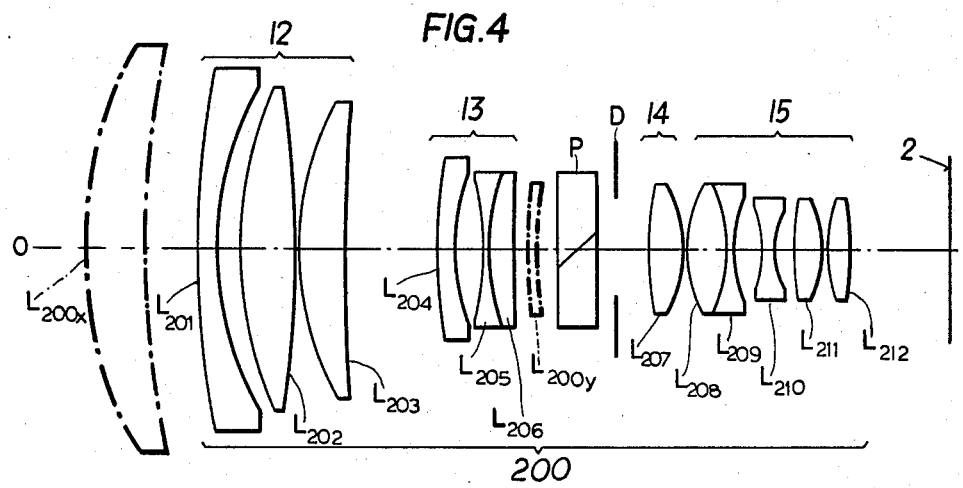
FIG. 4 shows a camera objective embodying the principles described with reference to FIGS. 2A–2C.

FIG. 4 illustrates the application of my invention to an objective 200 of the type disclosed in U.S. Pat. No. 3,937,562, comprising a shiftable positive component 12, a shiftable negative component 13 and a fixed positive component 14 followed by a fixed-focus rear group 15. Components 12 consists of a negative lens $L_{201}$ and two positive lenses $L_{202}$, $L_{203}$; component 13 is formed from a negative singlet $L_{204}$ and a negative doublet $L_{205}$, $L_{206}$ whereas component 14 is a single biconvex lens $L_{207}$. Rear group 15 is composed of a positive doublet $L_{208}$, $L_{209}$, a negative singlet $L_{210}$ and two positive singlets $L_{211}$, $L_{212}$. Prism P and diaphragm D are here inserted between components 13 and 14, this diagram space also accommodating in the telephoto position an ancillary planoconcave lens $L_{200y}$ whose interposition is accompanied by the placement of a supplemental, positive lens member $L_{200x}$ in front of objective 200 whereby the overall focal length of the system is further increased without dislocation of image plane 2. Naturally, members $L_{200x}$ and $L_{200y}$ need not be single lenses, as shown; this also applies to member $L_{100x}$ of the preceding embodiment and to analogous members of subsequent Figures.

In the following Table B I have given representative numerical values for the radii r, thicknesses and separations d, refractive indices $n_d$ and Abbé numbers $\nu_d$ for the lenses shown in FIG. 4. The overall focal length of this system changes from $f_{min}=7.5$ to $f_{max}=22$ in the varifocal range and increases to $f_{ext}=34$ in the presence of lenses $L_{200x}$ and $L_{200y}$. The system has a back-focal length s=9.298.

TABLE B

| | r | d | | $n_d$ | $\nu_d$ |
|---|---|---|---|---|---|
| | −97.000 | | | | |
| $L_{200x}$ | | 3.000 | | 1.492 | 54.67 |
| | ∞ | | | | |
| | | 4.000 | air space | | |
| | −88.381 | | | | |
| $L_{201}$ | | 1.950 | | 1.805 | 25.43 |
| | −32.209 | | | | |
| | | 3.200 | air space | | |
| | −42.597 | | | | |
| $L_{202}$ | | 6.000 | | 1.603 | 60.60 |
| | −387.159 | | | | |
| | | 0.100 | air space | | |
| | −28.656 | | | | |
| | | 6.950 | | 1.651 | 55.89 |
| $L_{203}$ | | | | | |
| | −913.857 | | | | |
| | | $f_{min}$ 0.510 | variable | | |
| | | $f_{max}$ 14.430 | air | | |
| | | ($f_{ext}$ 14.430) | space | | |
| | −508.015 | | | | |
| $L_{204}$ | | 1.000 | | 1.713 | 53.83 |
| | −12.563 | | | | |
| | | 3.250 | air space | | |
| | −47.668 | | | | |
| $L_{205}$ | | 1.000 | | 1.640 | 60.10 |
| | −14.773 | | | | |
| $L_{206}$ | | 2.800 | | 1.847 | 23.83 |
| | −53.225 | | | | |
| | | 3.000 | | | |
| | (∞) | | $f_{min}$ 20.530 | | |
| ($L_{200y}$) | | (1.000) | $f_{max}$ 7.000 | (1.517) | (64.17) |
| | (−27.000) | | variable air space | | |
| | | (3.000) | | | |
| | ∞ | | | | |
| P | | 5.000 | | 1.517 | 64.17 |
| | ∞ | | | | |
| | | 1.800 | diaphragm | | |
| D | — | | | | |
| | | 1.430 | space | | |
| | −36.362 | | | | |
| $L_{207}$ | | 2.700 | | 1.717 | 47.98 |
| | −45.739 | | | | |
| | | 0.100 | air space | | |
| | −12.644 | | | | |
| $L_{208}$ | | 5.500 | | 1.657 | 36.73 |
| | −19.780 | | | | |
| | | 2.200 | | 1.805 | 25.43 |
| $L_{209}$ | −26.779 | | | | |
| | | 1.100 | air space | | |
| | −27.135 | | | | |
| | | 3.300 | | 1.847 | 23.83 |
| $L_{210}$ | −13.397 | | | | |
| | | 2.000 | air space | | |
| | −67.244 | | | | |
| | | 3.000 | | 1.713 | 53.83 |
| $L_{211}$ | −13.501 | | | | |
| | | 0.100 | | | |
| | −12.103 | | | | |
| $L_{212}$ | | 3.000 | | 1.604 | 60.10 |
| | −508.015 | | | | |

In this case the prism P and the diaphragm D lie in a variable air space separating components 13 and 14 of the varifocal group, the length of this space changing from 28.760 for $f_{min}$ to 15.230 for $f_{max}$.

The objective 300 of FIG. 5 is generally similar to that of FIG. 4, except that its shiftable front component 19 is a biconcave singlet $L_{301}$ and its likewise shiftable second component 20 consists of two positive singlets $L_{302}$, $L_{303}$ while a fixed third component 21 is another biconcave singlet $L_{304}$. This varifocal group is separated from a fixed-focus group 22 by an air space containing prism P and diaphragm D. As before, a supplemental positive lens $L_{300x}$ and an ancillary negative lens $L_{300y}$ can be used to extend the overall focal length of the system beyond its varifocal range, the former being positioned in front of lens $L_{301}$ while the latter is inserted between lens $L_{304}$ and prism P in the diaphragm space. Group 22 consists of a positive singlet $L_{305}$, a negative singlet $L_{306}$ and another positive singlet $L_{307}$.

Representative numerical values for radii r, thicknesses and separations d, refractive indices $n_d$ and Abbe numbers $\nu_d$ are given in Table C, below, for a system whose overall focal length ranges from $f_{min}=10.6$ to $f_{max}=27.0$ without lenses $L_{300x}$, $L_{300y}$, the focal length increasing to $f_{ext}=37.0$ in the presence of these additional lenses.

commodates the ancillary lens $L_{300y}$ together with prism P and diaphragm D.

In a refinement of the system given in Table C, the front surface of lens $L_{300x}$ is made aspherical according to the formula $$x = \frac{y^2}{R(1+ \sqrt{1-y^2/R^2})} - k \cdot y^4$$

where x is the distance of any point on that surface from a reference plane transverse to axis O passing through the left-hand vertex of the lens, y is the distance of the point from the axis, R is the radius of an osculating sphere and k is a constant on the order of $1/R^4$. Within an area centered on the axis for which $y << R$ we can write $x \approx y^2/R$ which is the formula for a paraboloid of rotation. With R=20 (corresponding to the radius for the first lens surface given in Table C), k may have a value of $5.5 \cdot 10^{-6}$.

The objective 300 of FIG. 5 can also be adjusted to an extreme telephoto position by the technique described with reference to FIGS. 1A–1C, without use of the ancillary lens $L_{300y}$ but with a further axial shifting of

TABLE C

| | r | d | | $n_d$ | $\nu_d$ |
|---|---|---|---|---|---|
| ($L_{300x}$) | (+20.000) | (2.000) | | (1.492) | (54.67) |
| | (+23.780) | | | | |
| | | (7.000) | air space | | |
| $L_{301}$ | −160.000 | 1.500 | | 1.782 | 37.09 |
| | +35.700 | | | | |
| | | $f_{min}$ 41.961<br>$f_{max}$ 10.054<br>($f_{ext}$ 10.054) | variable<br>air space | | |
| $L_{302}$ | +508.000 | 4.000 | | 1.492 | 54.67 |
| | −33.600 | | | | |
| | | 0.100 | air space | | |
| $L_{303}$ | +31.000 | 4.000 | | 1.492 | 54.67 |
| | −155.600 | | | | |
| | | $f_{min}$ 2.150<br>$f_{max}$ 26.380<br>($f_{ext}$ 26.380) | variable<br>air space | | |
| $L_{304}$ | −52.760 | 1.000 | | 1.492 | 54.67 |
| | +31.700 | | | | |
| | | (2.000) | air space | | |
| ($L_{300y}$) | (∞) | (1.000) | | (1.492) | (54.67) |
| | (+48.137) | | | | |
| | | (2.000) | air space | | |
| P | ∞ | 5.000 | | 1.569 | 56.13 |
| | ∞ | | | | |
| D | — | 1.800<br>2.500 | diaphragm<br>space | | |
| $L_{305}$ | +10.980 | 4.300 | | 1.720 | 50.41 |
| | −87.360 | | | | |
| | | 0.940 | air space | | |
| $L_{306}$ | −22.200 | 4.770 | | 1.728 | 28.41 |
| | +8.300 | | | | |
| | | 1.480 | air space | | |
| $L_{307}$ | +16.200 | 2.900 | | 1.720 | 50.41 |
| | −16.200 | | | | |

Here the air space between the vertical and fixed-focus lens groups 19–21 and 22, of length 14.300, accommodates the ancillary lens $L_{300y}$ together with prism P and diaphragm D.

component 20 toward the object side, i.e. to the left, accompanied by the emplacement of lens $L_{300x}$. In this instance, lens $L_{301}$ is substantially stationary while lens $L_{304}$ is shiftable. The parameters of such a system are given in the following Table D; the overall focal length changes from $f_{min}=10.41$ to $f_{max}=29.16$ in the varifocal range and is increased to $f_{ext}=34.00$ by the adjustment according to my invention. The back-focal length is $s=11.700$.

supplemental lens $L_{300x}$ positioned between components 19 and 20 rather than forwardly thereof. The corresponding parameters are given in Table E, below, for a system whose overall focal length normally varies between $f_{min}=10.6$ and $f_{max}=26.9$ but can be increased

TABLE D

| | r | d | | | $n_d$ | $\nu_d$ |
|---|---|---|---|---|---|---|
| ($L_{300x}$) | (+380.000) | (2.000) | | | (1.492) | (54.67) |
| | ($\infty$) | (3.000) | | air space | | |
| $L_{301}$ | −106.100 | 1.700 | | | 1.744 | 44.77 |
| | +37.000 | | | | | |
| | | $f_{min}$ | 40.254 | variable | | |
| | | $f_{max}$ | 4.976 | air space | | |
| | | ($f_{ext}$ | 3.469) | | | |
| $L_{302}$ | +450.000 | 3.400 | | | 1.517 | 64.17 |
| | −34.700 | | | | | |
| | | 0.100 | | air space | | |
| | +25.530 | | | | | |
| $L_{303}$ | | 4.200 | | | 1.517 | 64.17 |
| | −450.000 | | | | | |
| | | $f_{min}$ | 1.122 | variable | | |
| | | $f_{max}$ | 24.849 | air space | | |
| | | ($f_{ext}$ | 26.356) | | | |
| | −54.410 | | | | | |
| $L_{304}$ | | 1.000 | | | 1.623 | 58.06 |
| | +38.000 | | | | | |
| | | $f_{min}$ | 1.181 | variable | | |
| | | $f_{max}$ | 12.732 | air space | | |
| | | ($f_{ext}$ | 12.732) | | | |
| P | $\infty$ | 5.000 | | | 1.517 | 64.17 |
| | $\infty$ | | | | | |
| D | — | 1.800 | | diaphragm | | |
| | | 3.500 | | space | | |
| | +12.350 | | | | | |
| $L_{305}$ | | 3.400 | | | 1.782 | 37.09 |
| | <24.020 | | | | | |
| | | 0.850 | | air space | | |
| | −15.000 | | | | | |
| $L_{306}$ | | 6.250 | | | 1.805 | 25.43 |
| | +9.500 | | | | | |
| | | 0.900 | | air space | | |
| | +18.280 | | | | | |
| $L_{307}$ | | 3.200 | | | 1.691 | 54.71 |
| | −13.020 | | | | | |

In the foregoing table the last variable air space is measured between lens $L_{304}$ and prism P. Since the position of the prism is not critical (in fact, it might be omitted), that space could also be measured between lenses $L_{304}$ and $L_{305}$ if the latter lens—like lens $L_{207}$ in FIG. 4—is considered part of the varifocal group, i.e. 11.481 for $f_{min}$ and 24.032 for $f_{max}$ and $f_{ext}$.

In FIG. 6 I have shown the same objective 300 as in FIG. 5, with insertion of ancillary lens $L_{300y}$ but with to $f_{ext}=34.5$ by the addition of these extra lenses. In this instance, too, the optical properties in the extreme telephoto positions can be further improved by using an aspherical front surface for lens $L_{300x}$ according to the formula given in connection with Table C, or at least a paraboloidal approximation thereof. Elements P, D and $L_{305}$–$L_{307}$ have the same dimensions and spacings as in Table C, with a back-focal length $s=12.906$.

TABLE E

| | r | d | | | $n_d$ | $\nu_d$ |
|---|---|---|---|---|---|---|
| $L_{301}$ | −160.000 | 1.500 | | | 1.782 | 37.09 |
| | +35.700 | | | | | |
| | | (4.000) | | | | |
| ($L_{300x}$) | (+20.000) | (1.500) | | $f_{min}$ 41.961 | (1.492) | (54.67) |
| | (+24.700) | | | $f_{max}$ 10.050 | | |
| | | (4.500) | | variable air space | | |
| $L_{302}$ | +508.000 | 4.000 | | | 1.492 | 54.67 |
| | −33.600 | | | | | |
| | | 0.100 | | air space | | |
| | +31.000 | | | | | |
| $L_{303}$ | | 4.000 | | | 1.492 | 54.67 |
| | −155.600 | | | | | |

TABLE E-continued

| | r | d | | $n_d$ | $v_d$ |
|---|---|---|---|---|---|
| | | $f_{min}$ 2.154 | variable | | |
| | | $f_{max}$ 26.380 | air space | | |
| | | ($f_{ext}$ 26.380) | | | |
| | −52.760 | | | | |
| $L_{304}$ | | 1.000 | | 1.492 | 54.67 |
| | +31.700 | | | | |
| | | (2.000) | air space | | |
| | (∞) | | | | |
| ($L_{300y}$) | | (1.000) | | (1.492) | (54.67) |
| | (+48.000) | | | | |
| | | (2.000) | air space | | |
| P | ∞ | 5.000 | | 1.569 | 56.13 |
| | ∞ | | | | |
| | | 1.800 | diaphragm | | |
| D | — | | space | | |
| | | 2.500 | | | |
| | 10.980 | | | | |
| $L_{305}$ | | 4.300 | | 1.720 | 50.41 |
| | −87.360 | | | | |
| | | 0.940 | air space | | |
| | −22.200 | | | | |
| $L_{306}$ | | 4.770 | | 1.728 | 28.41 |
| | +8.300 | | | | |
| | | 1.480 | air space | | |
| | +16.200 | | | | |
| $L_{307}$ | | 2.900 | | 1.720 | 50.41 |
| | −16.200 | | | | |

The axial shifting of the movable components of any of the aforedescribed objectives can be brought about in the well-known manner with the aid of rotatable or slidable cam members. FIG. 7 shows, in developed view, a camming sleeve 30 coaxial with a control ring 31, the latter being provided with axially extending guide slots 34, 34' traversed by pins 35 and 36 which are rigid with the lens mounts for the shiftable components, e.g. those designated 8 and 9 in FIG. 3. Pins 35 and 36 also pass through respective camming slots 38 and 39 in sleeve 30 which bring about their independent axial displacement upon relative rotation of members 30 and 31.

The camming slots 38 and 39 are seen to be divided into three sections corresponding to respective operating zones α, β and γ. Zone α represents the normal varifocal range in which slot 38 has a constant slope or pitch angle for a linear shifting of component 8. In zones β and γ, the slot 38 has zero pitch so that no further displacement of component 8 occurs even though component 9 continues to move under the control of slot 39. It will be noted that this slot is so shaped as to shift component 9 toward the right, i.e. from its dotted-line position to its full-line position as seen in FIG. 3, upon rotation of ring 31 past the telephoto end of the varifocal range as indicated by an arrow A. A shift of component 9 in the opposite direction, i.e. toward the left, takes place in zone γ under the control of slot 39 as the ring 31 is rotated in a reverse sense past the wide-angle end of the varifocal range as indicated by an arrow B; this latter displacement serves for the focusing of the objective in the macro range as discussed above.

In FIG. 7 I have also schematically indicated the provision of retractable stops 29, 29' for blocking the transition frame from zone α to either of the other two zones under certain conditions, e.g. as more fully described hereinafter with reference to FIGS. 10–12. Stops 29 and 29' are shown to coact with a pin 37 on sleeve 30 extending into a guide slot 33 of ring 31.

Figure 8:
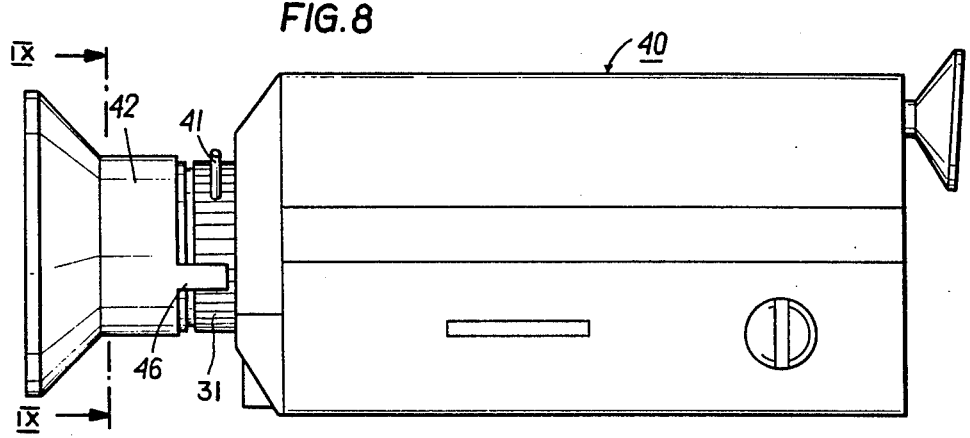
FIG. 8 is an elevational view of a camera equipped with such a system.
Figure 9:
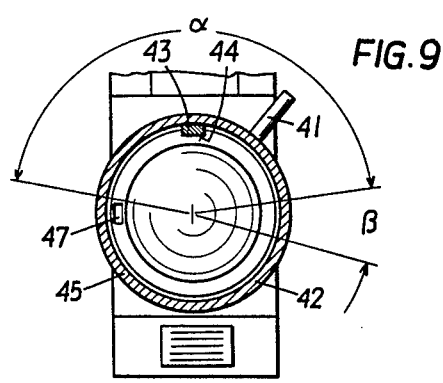
FIG. 9 is a cross-sectional view taken on the line IX—IX of FIG. 8.

FIGS. 8 and 9 illustrate a motion-picture camera 40 of conventional construction equipped with an objective of the type shown in FIG. 3, for example, whose focal length is adjustable within the normal varifocal limits as well as into an extended telephoto range in which the camera is to be fitted with a front attachment 42 carrying a supplemental lens member of positive refractivity. A manually operable handle 41 on control ring 31 (cf. FIG. 7) can be swung, upon the release of a nonillustrated detent, through a large arc corresponding to zone α and a smaller arc corresponding to zone β as seen in FIG. 9; an opposite swing into the zone γ discussed with reference to FIG. 7 may also be allowed. Attachment 42, holding for example the lens $L_{100x}$ of FIG. 3, has a lug 43 fitting into a groove 44 of the objective housing 45. Another such groove 47, differing in size and location from groove 44, is engageable by a lug of a similar attachment carrying a negative lens to be used in the marco range upon shifting of component 9 to a position in zone γ, such an attachment having been illustrated in FIG. 11 discussed hereinafter. Thus, either type of attachment occupies a characteristic position when mounted on the objective housing.

Attachment 42 further has a projection 46 extending into the path of handle 41 to form an abutment which defines the correct position of component 9 for the particular supplemental lens carried by it. This insures a correct positioning of the image plane if the camera can be selectively fitted with a variety of telephoto attachments. The same applies, of course, to wide-angle attachments usable in the marco range.

Figure 10:
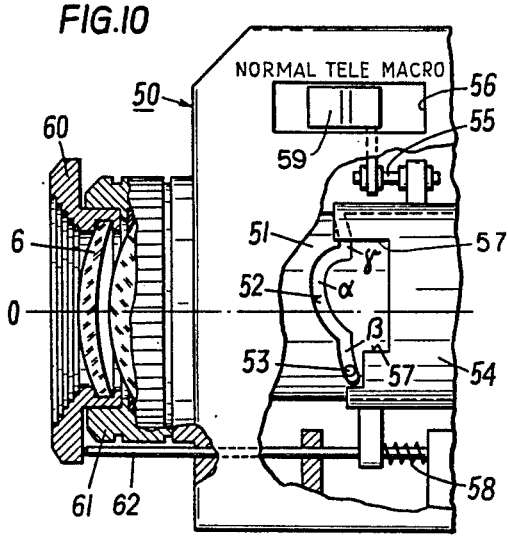
FIG. 10 is a side-elevational view (parts broken away) of the front part of a camera equipped with an objective of the type shown in FIG. 3, including a removable front attachment.

FIG. 10 illustrates a camera 50 having a camming sleeve 51 with a slot 52 generally similar to the slot 39 of FIG. 7, the slot being again divided into three sections corresponding to respective zones α, β and γ. A nonrotatable blocking sleeve 54 is positively connected with a slide 59 which moves within a slot 56 between three positions respectively labeled "NORMAL," "TELE" and "MARCRO." In position "NORMAL," the objective can be used only within its varifocal range as the extremities of slot 52 are overlain by respective ledges 57 and 57' of sleeve 54, thus preventing the cam-follower pin 53 of component 9 (FIG. 3) from moving into either the extended telephoto zone β or the macro zone γ. In slider position "TELE" the lower part of slot 52 is uncovered, allowing operation in the extended telephoto zone, whereas in position "MACRO" the upper slot extremity is also accessible to facilitate the taking of closeups.

A push rod 62 rigid with sleeve 54 projects forwardly under pressure of a spring 58 which tends to hold the sleeve in its position "NORMAL," the rod 62 extending past the objective housing 61 as long as no attachment is mounted thereon.

If a telephoto attachment 60 with a positive lens 6 is secured to the objective housing, the presence of this attachment is sensed by the rod 62 which represses the sleeve 54 into its position "TELE" and indicates this fact to the user with the aid of slider 59. Another attachment 63, shown in FIG. 11, carries a negative lens 64 for the taking of closeups; attachment 63 has a peripheral flange 63' which partly embraces the objective housing 61 and represses the sensing rod 62 still further to the right, thus moving the slider 59 into the position "MACRO" and fully unblocking the camming slot 52.

Figure 12:
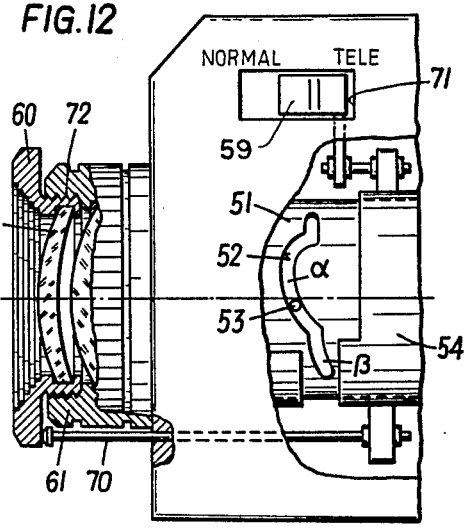
FIG. 12 is a view similar to FIG. 10, illustrating a modification.

FIG. 12 shows a similar camera whose camming slot 52, however, lacks the extension labeled γ in FIG. 10. Slider 59, accordingly, is manually shiftable only between positions "NORMAL" and "TELE" within a slot 71, with selective blocking or unblocking of slot extension β. Sleeve 54 is indexable in position "NORMAL" or is urged into that position by a strong biasing spring (not shown) so that a push rod 70 rigid therewith prevents the emplacement of an attachment 60 on the objective housing 61 in that position. Thus, the user must first shift the sider 59 to the position "TELE" before the attachment can be used. In FIG. 12 the attachment 60 and the objective housing 61 are shown provided with complementary threads facilitating the emplacement of lens member 6 which may correspond to lens $L_{100x}$ of FIG. 3.

Figure 11:
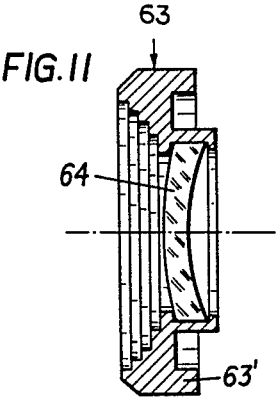
FIG. 11 is an axial sectional view of an alternate attachment for the camera shown in FIG. 10.
Figure 13:
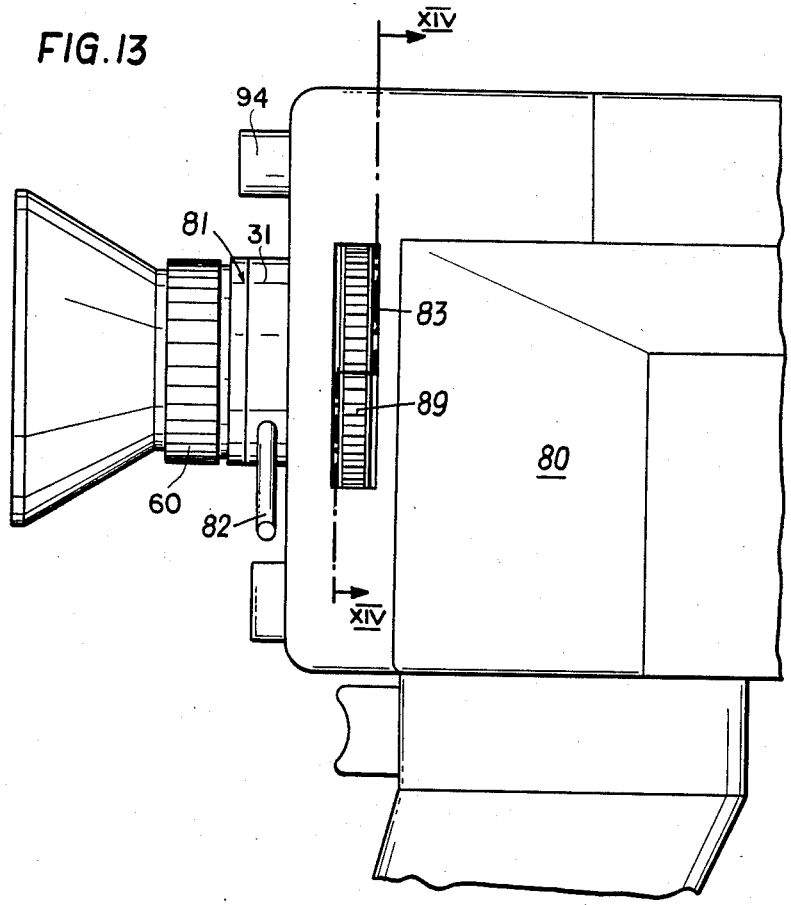
FIG. 13 is a side-elevational view of the front part of a camera equipped with an objective of the type shown in FIG. 4.
Figure 14:
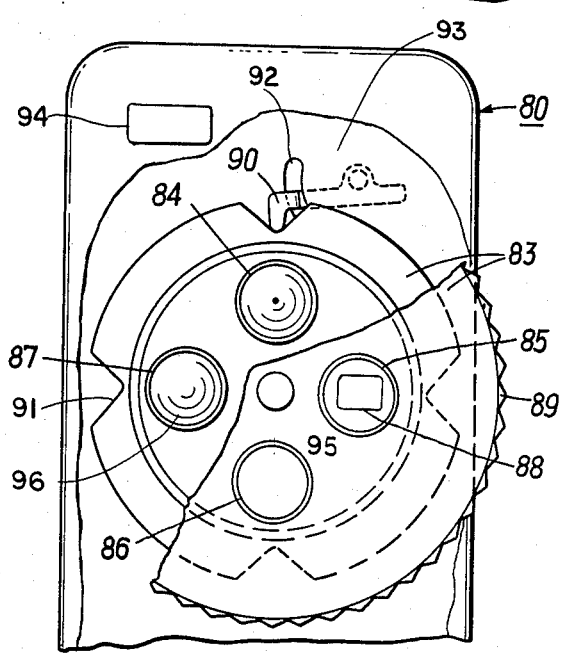
FIG. 14 is a fragmentary cross-sectional view of the camera shown in FIG. 13, taken generally on line XIV—XIV thereof.

In FIGS. 13 and 14 I have shown a camera 80 in which an ancillary lens member 17, which may be the lens $L_{200y}$ of FIG. 4, is interposable in the lens assembly of a varifocal objective whose housing 81 can be fitted with an attachment 60 or 63 as shown in FIGS. 10–12. A control ring 31 on the objective housing is rotatable by a handle 82.

The camera body has a lateral aperture through which a disk 83, provided with knurled rim 89, projects for manual rotation about a shaft 95 offset from the optical axis O. Disk 83 has four angularly equispaced circular cutouts 84–87 and is provided with as many peripheral notches 91 engageable by a detent 90 for releasable indexing in any position in which one of these cutouts is in line with the optical axis. Detent 90, passing through a slot 92 in a partition 93 of the camera housing, may be biased by a nonillustrated spring into engagement with notches 91. The camera is further provided with a viewfinder 94 and other conventional devices.

Besides the negatively refracting ancillary lens 17, lodged in cutout 84, there may also be provided a positively refracting ancillary lens 96 for interposition in the taking of closeups with the aid of a negative supplemental lens 64 as shown in FIG. 11. Lens 96 is shown mounted in cutout 87 whereas cutout 85 holds a toroidal lens 88 for the taking of anamorphotic pictures. Cutout 86 is empty and is aligned with axis O during normal focusing in the varifocal range.

Although my invention has been particularly described in its application to varifocal or pancratic objectives, its teachings are also applicable to objectives of fixed focus. Aside from being useful in photography, the invention could be readily adapted to the enlargement of scenes viewed through a telescope. A device similar to slider 59 of FIG. 10, indicating the adjustment of the objective to the extended telephoto range, may also serve to alert the user to the desirability of placing the camera on a tripod or other suitable support.

The position-feeling or emplacement-blocking mechanism of FIGS. 10 and 12 is of the general type disclosed and claimed, for use with wide-angle attachments, in the aforementioned copending application Ser. No. 711,835 now U.S. Pat. No. 4,110,005.

I claim:

1. In an optical objective including a positively refracting lens assembly centered on an optical axis and adapted to focus incident rays from remote objects upon a receiving surface in line with an image plane located rearwardly of said lens assembly, the combination therewith of focal-length-increasing means for enlarging the image scale of said lens assembly, with consequent rearward displacement of said image plane from a normal position, and a positively refracting supplemental lens member emplaceable on said axis in line with said lens assembly for restoring said image plane to said normal position thereof.

2. The combination defined in claim 1 wherein said focal-length-increasing means comprises an axially shiftable member of said lens assembly and mechanism for axially displacing said axially shiftable member.

3. The combination defined in claim 2 wherein said lens assembly includes a varifocal lens group with two axially shiftable components for selectively establishing a wide-angle position and a telephoto position between which said image plane remains fixed, said axially shiftable member being one of said components.

4. The combination defined in claim 3 wherein said supplemental lens member is emplaceable on the side of said axially shiftable member remote from said image plane.

5. The combination defined in claim 4 wherein the objective is part of a camera provided with an objective housing, said supplemental lens member being part of a front attachment emplaceable on said objective housing.

6. The combination defined in claim 5 wherein the camera is provided with inhibiting means normally blocking a displacement of said one of said components by said mechanism beyond said telephoto position, said inhibiting means being deactivable by said attachment upon emplacement thereof on said objective housing.

7. The combination defined in claim 5 wherein the camera is provided with selector means for optionally blocking and unblocking a displacement of said one of said components by said mechanism beyond said telephoto position, said selector means having an extension preventing the emplacement of said attachment on said camera in a blocking position.

8. The combination defined in claim 5 wherein said supplemental lens member $L_{100x}$ and the lenses $L_{101}$–$L_{110}$ of said varifocal lens group have radii of curvature r, axial thickness and separations d, refractive indices $n_d$ and Abbé numbers $v_d$ substantially as given in the following table:

|  | r | d |  | $n_d$ | $v_d$ |
|---|---|---|---|---|---|
|  | (+740.0) |  |  |  |  |
| ($L_{100x}$) |  | (3.0) |  | (1.52) | (64) |
|  | ($\infty$) |  |  |  |  |
|  |  | (1.0) | air space |  |  |
|  | +180.6 |  |  |  |  |
| $L_{101}$ |  | 2.4 |  | 1.81 | 25 |
|  | +48.1 |  |  |  |  |
| $L_{102}$ |  | 5.7 |  | 1.61 | 59 |
|  | +242.5 |  |  |  |  |
|  |  | 0.1 | air space |  |  |
|  | +55.8 |  |  |  |  |
| $L_{103}$ |  | 5.9 |  | 1.62 | 60 |
|  | −1,034.5 |  |  |  |  |
|  |  | 0.1 | air space |  |  |
|  | +40.0 |  |  |  |  |
| $L_{104}$ |  | 3.9 |  | 1.74 | 45 |
|  | +81.3 |  |  |  |  |
|  |  | $f_{min}$ 1.2 | variable |  |  |
|  |  | $f_{max}$ 27.8 | air space |  |  |
|  |  | ($f_{ext}$ 27.8) |  |  |  |
|  | +126.4 |  |  |  |  |
| $L_{105}$ |  | 1.2 |  | 1.69 | 55 |
|  | +13.9 |  |  |  |  |
|  |  | 5.2 | air space |  |  |
|  | −33.2 |  |  |  |  |
| $L_{106}$ |  | 1.0 |  | 1.62 | 60 |
|  | +18.4 |  |  |  |  |
| $L_{107}$ |  | 3.1 |  | 1.81 | 25 |
|  | +84.0 |  |  |  |  |
|  |  | $f_{min}$ 23.9 | variable |  |  |
|  |  | $f_{max}$ 3.0 | air space |  |  |
|  |  | ($f_{ext}$ 8.0) |  |  |  |
|  | −16.0 |  |  |  |  |
| $L_{108}$ |  | 1.0 |  | 1.74 | 45 |
|  | −59.8 |  |  |  |  |
|  |  | $f_{min}$ 12.5 | variable |  |  |
|  |  | $f_{max}$ 6.8 | air space |  |  |
|  |  | ($f_{ext}$ 1.7) |  |  |  |
|  | +108.1 |  |  |  |  |
| $L_{109}$ |  | 3.4 |  | 1.62 | 60 |
|  | −45.8 |  |  |  |  |
|  |  | 0.1 | air space |  |  |
|  | +74.7 |  |  |  |  |
| $L_{110}$ |  | 2.7 |  | 1.62 | 60 |
|  | −113.2 |  |  |  |  |

9. The combination defined in claim 8 wherein said lens assembly further comprises a fixed-focus lens group on the image side of said varifocal lens group, the lenses $L_{111}$–$L_{115}$ of said fixed-focus lens group having radii of curvature r, axial thicknesses and separations d, refractive indices $n_d$ and Abbé numbers $v_d$ substantially as given in the following table:

|  | r | d | $n_d$ | $v_d$ |
|---|---|---|---|---|
|  | +36.5 |  |  |  |
| $L_{111}$ |  | 3.5 | 1.62 | 60 |
|  | −116.1 |  |  |  |
|  |  | 0.1 | air space |  |
|  | +19.5 |  |  |  |
| $L_{112}$ |  | 3.5 | 1.62 | 60 |
|  | +42.3 |  |  |  |
|  |  | 4.9 | air space |  |
|  | −20.5 |  |  |  |
| $L_{113}$ |  | 2.6 | 1.85 | 24 |
|  | +20.5 |  |  |  |
|  |  | 4.0 | air space |  |

-continued

|  | r | d | $n_d$ | $v_d$ |
|---|---|---|---|---|
|  | +1124.0 |  |  |  |
| $L_{114}$ |  | 4.1 | 1.71 | 54 |
|  | −15.1 |  |  |  |
|  |  | 0.1 | air space |  |
|  | +18.1 |  |  |  |
| $L_{115}$ |  | 2.8 | 1.62 | 60 |
|  | +69.9 |  |  |  |

10. The combination defined in claim 4 wherein said one of said components is of positive refractivity and is shiftable by said mechanism away from said image plane.

11. The combination defined in claim 10 wherein said supplemental front lens $L_{300x}$ and the lenses $L_{301}$–$L_{304}$ of said varifocal lens group have radii of curvature r, axial thicknesses and separations d, refractive indices $n_d$ and Abbé numbers $v_d$ substantially as given in the following table:

|  | r | d | $n_d$ | $v_d$ |
|---|---|---|---|---|
|  | (+380.0) |  |  |  |
| ($L_{300x}$) |  | (2.0) | (1.49) | (55) |
|  | ($\infty$) |  |  |  |
|  |  | (3.0) | air space |  |
|  | −106.1 |  |  |  |

-continued

|  | r | d | $n_d$ | $\nu_d$ |
|---|---|---|---|---|
| $L_{301}$ | +37.0 | 1.7 | 1.74 | 45 |
|  | +450.0 | $f_{min}$ 40.3<br>$f_{max}$ 5.0<br>($f_{ext}$ 3.5) | variable<br>air space |  |
| $L_{302}$ | −34.7 | 3.4 | 1.52 | 64 |
|  | +25.5 | 0.1 | air space |  |
| $L_{303}$ | −450.0 | 4.2 | 1.52 | 64 |
|  | −54.4 | $f_{min}$ 1.1<br>$f_{max}$ 24.8<br>($f_{ext}$ 26.4) | variable<br>air space |  |
| $L_{304}$ | +38.0 | 1.0 | 1.62 | 58 |

12. The combination defined in claim 10 wherein said lens assembly further comprises a fixed-focus lens group on the image side of said varifocal lens group, the lenses $L_{305}$–$L_{307}$ of said fixed-focus lens group having radii of curvature r, axial thicknesses and separations d, refractive indices $n_d$ and Abbé numbers $\nu_d$ substantially as given in the following table:

|  | r | d | $n_d$ | $\nu_d$ |
|---|---|---|---|---|
| $L_{305}$ | +12.4 | 3.4 | 1.78 | 37 |
|  | −24.0 | 0.9 | air space |  |
| $L_{306}$ | −15.0 | 6.3 | 1.81 | 25 |
|  | +9.5 | 0.9 | air space |  |
| $L_{307}$ | +18.3 | 3.2 | 1.69 | 55 |
|  | −13.0 |  |  |  |

13. The combination defined in claim 1 wherein said focal-length-increasing means comprises an ancillary negatively refracting lens member interposable in said lens assembly, on the image side of said supplemental lens member, and mechanism for selectively interposing said ancillary lens member.

14. The combination defined in claim 13 wherein said lens assembly includes a varifocal lens group with two axially shiftable components for selectively establishing a wide-angle position and a telephoto position between which said image plane remains fixed, said ancillary lens member being insertable by said mechanism in said telephoto position on the image side of said shiftable components.

15. The combination defined in claim 14 wherein said mechanism comprises a lens carrier rotatable about an axis parallel to said optical axis.

16. The combination defined in claim 15 wherein said lens carrier is a disk with a plurality of peripherally spaced cutouts, one of said cutouts being provided with said ancillary lens member.

17. The combination defined in claim 16, further comprising indexing means for arresting said disk in a position of alignment of any of said apertures with said lens assembly.

18. The combination defined in claim 14 wherein said supplemental lens member is emplaceable on the object side of said shiftable components.

19. The combination defined in claim 18 wherein said supplemental lens member has an aspherical surface approximating a paraboloid of rotation.

20. The combination defined in claim 19 wherein said aspherical surface is defined by the formula $$x = \frac{y^2}{R(1+\sqrt{1-y^2/R^2})} - k \cdot y^4$$

where x is the distance from a reference plane transverse to said axis, y is the distance from said axis and R is the radius of an osciliating sphere, k being a constant on the order of $1/R^4$.

21. The combination defined in claim 18 wherein said supplemental lens member $L_{200x}$, said ancillary lens member $L_{200y}$ and the lenses $L_{201}$–$L_{205}$ of said varifocal lens group have radii of curvature r, axial thicknesses and separations d, refractive indices $n_d$ and Abbé numbers $\nu_d$ substantially as given in the following table:

|  | r | d | $n_d$ | $\nu_d$ |
|---|---|---|---|---|
| ($L_{200x}$) | (+97.0) | (3.0) | (1.49) | (55) |
|  | (∞) | (4.0) | air space |  |
| $L_{201}$ | +88.4 | 2.0 | 1.81 | 25 |
|  | +32.2 | 3.2 | air space |  |
| $L_{202}$ | +42.6 | 6.0 | 1.60 | 61 |
|  | −387.2 | 0.1 | air space |  |
|  | +28.7 |  |  |  |

-continued

| | r | d | | $n_d$ | $v_d$ |
|---|---|---|---|---|---|
| $L_{203}$ | | 7.0 | | 1.65 | 56 |
| | −913.9 | | | | |
| | | $f_{min}$ 0.5 <br> $f_{max}$ 14.4 <br> ($f_{ext}$ 14.4) | variable <br> air space | | |
| | +508.0 | | | | |
| $L_{204}$ | | 1.0 | | 1.71 | 54 |
| | +12.6 | | | | |
| | | 3.3 | air space | | |
| | −47.7 | | | | |
| $L_{205}$ | | 1.0 | | 1.64 | 60 |
| | +14.8 | | | | |
| $L_{206}$ | | 2.8 | | 1.85 | 24 |
| | +53.2 | | | | |
| | | (3.0) | | | |
| | (∞) | | $f_{min}$ 28.8 | | |
| ($L_{200y}$) | | (1.0) | $f_{max}$ 15.2 <br> variable <br> air space | (1.52) | (64) |
| | (+27.0) | | | | |
| | | (11.2) | | | |
| | +36.4 | | | | |
| $L_{207}$ | | 2.7 | | 1.72 | 48 |
| | −45.7 | | | | |

22. The combination defined in claim 21 wherein said lens assembly further comprises a fixed-focus lens group on the image side of said varifocal lens group, the lenses $L_{207}$–$L_{212}$ of said fixed-focus lens group having radii of curvature r, axial thicknesses and separations d, refractive indices $n_d$ and Abbé numbers $v_d$ substantially as given in the following table:

| | r | d | $n_d$ | $v_d$ |
|---|---|---|---|---|
| | +12.6 | | | |
| $L_{208}$ | | 5.5 | 1.66 | 37 |
| | −19.8 | | | |
| $L_{209}$ | | 2.2 | 1.81 | 25 |
| | +26.8 | | | |
| | | 1.1 | air space | |
| | −27.1 | | | |
| $L_{210}$ | | 3.3 | 1.85 | 24 |
| | +13.4 | | | |
| | | 2.0 | air space | |
| | +67.2 | | | |
| $L_{211}$ | | 3.0 | 1.71 | 54 |

-continued

| | r | d | $n_d$ | $v_d$ |
|---|---|---|---|---|
| | −13.5 | | | |
| | | 1.0 | air space | |
| | +12.1 | | | |
| $L_{212}$ | | 3.0 | 1.60 | 60 |
| | −508.0 | | | |

23. The combination defined in claim 18 wherein said supplemental lens member $L_{300x}$, said ancillary lens member $L_{300y}$ and the lenses $L_{301}$–$L_{304}$ of said varifocal lens group have radii of curvature r, axial thicknesses and separations d, refractive indices $n_d$ and Abbé numbers $v_d$ substantially as given in the following table:

| | r | d | | $n_d$ | $v_d$ |
|---|---|---|---|---|---|
| | (+20.0) | | | | |
| ($L_{300x}$) | | (2.0) | | (1.49) | (55) |
| | (+23.8) | | | | |
| | | (7.0) | air space | | |
| | −160.0 | | | | |
| $L_{301}$ | | 1.5 | | 1.78 | 37 |
| | +35.7 | | | | |
| | | $f_{min}$ 42.0 <br> $f_{max}$ 10.1 <br> ($f_{ext}$ 10.1) | variable <br> air space | | |
| | +508.0 | | | | |
| $L_{302}$ | | 4.0 | | 1.49 | 55 |
| | −33.6 | | | | |
| | | 0.1 | air space | | |
| | +31.0 | | | | |
| $L_{303}$ | | 4.0 | | 1.49 | 55 |
| | −1.55.6 | | | | |
| | | $f_{min}$ 2.2 <br> $f_{max}$ 26.4 <br> ($f_{ext}$ 26.4) | variable <br> air space | | |
| | −52.8 | | | | |
| $L_{304}$ | | 1.0 | | 1.49 | 55 |
| | +31.7 | | | | |
| | | (2.0) | air space | | |
| | (∞) | | | | |
| ($L_{300y}$) | | (1.0) | | (1.49) | (55) |
| | (+48.0) | | | | |

24. The combination defined in claim 23 wherein said supplemental lens member $L_{300x}$ has an aspherical front surface substantially defined by the formula and separations d, refractive indices $n_d$ and Abbé numbers $\nu_d$ substantially as given in the following table:

| | r | d | | $n_d$ | $\nu_d$ |
|---|---|---|---|---|---|
| | −160.0 | | | | |
| $L_{301}$ | | 1.5 | | 1.78 | 37 |
| | +35.7 | | | | |
| | | (4.0) | | | |
| | (+20.0) | | $f_{min}$ 42.0 | | |
| $(L_{300x})$ | | (1.5) | $f_{max}$ 10.1 | (1.49) | (55) |
| | (+24.7) | | variable | | |
| | | (4.6) | air space | | |
| | +508.0 | | | | |
| $L_{302}$ | | 4.0 | | 1.49 | 55 |
| | −33.6 | | | | |
| | | 0.1 | air space | | |
| | +31.0 | | | | |
| $L_{303}$ | | 4.0 | | 1.49 | 55 |
| | −155.6 | | | | |
| | | $f_{min}$ 2.2 | variable | | |
| | | $f_{max}$ 26.4 | air space | | |
| | | $(f_{ext}$ 26.4) | | | |
| | −52.8 | | | | |
| $L_{304}$ | | 1.0 | | 1.49 | 55 |
| | +31.7 | | | | |
| | | 2.0 | air space | | |
| | (∞) | | | (1.49) | (55) |
| $(L_{300y})$ | | (1.0) | | | |
| | (+48.0) | | | | |

$$x = \frac{y^2}{20(1+ \sqrt{1-y^2/400}\ )} - 5.5 \cdot 10^{-6} y^4$$

where x is the distance from a reference plane transverse to said axis and y is the distance from said axis.

25. The combination defined in claim 23 wherein said lens assembly further comprises a fixed-focus lens group on the image side of said varifocal lens group, the lenses $L_{305}$–$L_{307}$ of said fixed-focus lens group having radii of curvature r, axial thickness and separations d, refractive indices $n_d$ and Abbé numbers substantially as given in the following table:

| | r | d | $n_d$ | $\nu_d$ |
|---|---|---|---|---|
| | +11.0 | | | |
| $L_{305}$ | | 4.3 | 1.72 | 50 |
| | −87.4 | | | |
| | | 0.9 | air space | |
| | −22.2 | | | |
| $L_{306}$ | | 4.8 | 1.73 | 28 |
| | +8.3 | | | |
| | | 1.5 | air space | |
| | +16.2 | | | |
| $L_{307}$ | | 2.9 | 1.72 | 50 |
| | −16.2 | | | |

26. The combination defined in claim 18 wherein said supplemental lens member $L_{300x}$, said ancillary lens member $L_{300y}$ and the lenses $L_{301}$–$L_{304}$ of said varifocal lens group have radii of curvature r, axial thicknesses 27. The combination defined in claim 26 wherein said supplemental lens member $L_{300x}$ has an aspherical front surface substantially defined by the formula $$x = \frac{y^2}{20(1+ \sqrt{1-y^2/400}\ )} - 5.5 \cdot 10^{-6} y^4$$

where x is the distance from a reference plane transverse to said axis and y is the distance from said axis.

28. The combination defined in claim 26 wherein said lens assembly further comprises a fixed-focus lens group on the image side of said varifocal lens group, the lenses $L_{305}$–$L_{307}$ of said fixed-focus lens group having radii of curvature r, axial thicknesses and separations d, refractive indices $n_d$ and Abbé numbers $\nu_d$ substantially as given in the following table:

| | r | d | $n_d$ | $\nu_d$ |
|---|---|---|---|---|
| | +11.0 | | | |
| $L_{305}$ | | 4.3 | 1.72 | 50 |
| | −37.4 | | | |
| | | 0.9 | air space | |
| | −22.2 | | | |
| $L_{306}$ | | 4.8 | 1.73 | 28 |
| | +8.3 | | | |
| | | 1.5 | air space | |
| | +16.2 | | | |
| $L_{307}$ | | 2.9 | 1.72 | 50 |
| | −16.2 | | | |

* * * * *